Nov. 29, 1949     H. BRUMMER     2,489,397
TIRE VALVE OPERATING DEVICE
Filed May 5, 1944
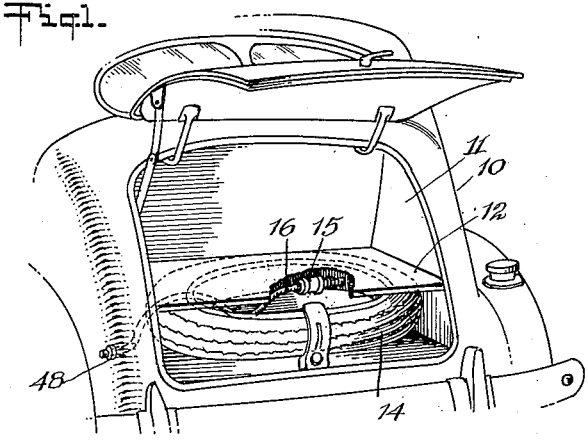
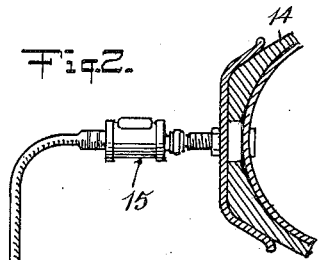
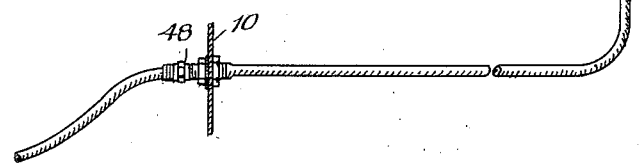
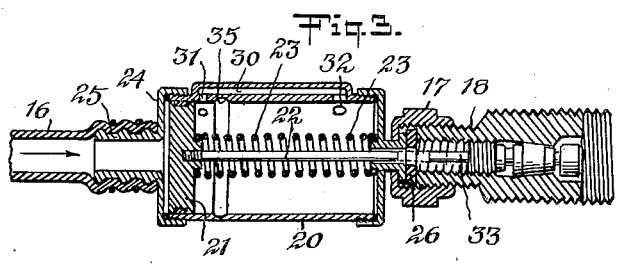
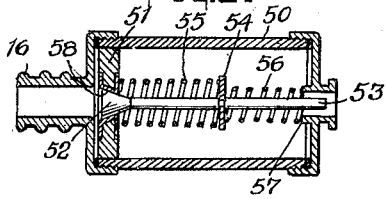
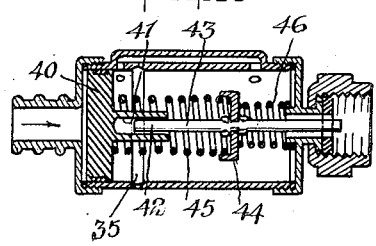
INVENTOR.
Henry Brummer
BY
Munn, Liddy & Glaccum
Attorneys Patented Nov. 29, 1949

2,489,397

UNITED STATES PATENT OFFICE 2,489,397

TIRE VALVE OPERATING DEVICE

Henry Brummer, Queens Village, N. Y.

Application May 5, 1944, Serial No. 534,371

7 Claims. (Cl. 137—69.5)

This invention relates to valves and more particularly to a mechanism to operate valves and particularly tire valves.

In the modern car a spare tire is quite often carried in the trunk of the car or in some other place where it is not always readily accessible without opening of the trunk. As a result motorists who are quite diligent about the amount of air in the tires on the vehicle quite often forget the spare tire until it becomes necessary to use it. It is likewise true that filling station attendants will neglect the spare tire because of the difficulty of reaching it.

An object of this invention is to provide means whereby the air in a spare tire may be replenished and checked without opening the trunk.

A further object is to provide a valve operating device which will enable the user to put air into the tire from the outside and which will automatically open the tire valve when under air pressure and allow the tire valve to close when the pressure is removed.

Other objects and advantages of my invention will appear from the accompanying description and drawings, in which Figure 1 is a perspective view of a car having my device mounted therein;

Fig. 2 is an enlarged section showing the manner in which the device is used;

Fig. 3 is a cross sectional view of one form of my device;

Fig. 4 is a modification thereof;

Fig. 5 is a further modification.

Referring more particularly to the drawings, the particular car shown 10 has a rear compartment 11 with a baggage platform 12 under which is mounted the spare tire 14. My device 15 is provided with a hose 16 at one end and a nipple 17 at the other end adapted to screw onto the stem 18 of a conventional tire valve. My device is preferably, though not necessarily, cylindrical in shape and has a cylinder 20 in which is mounted piston 21 having a rod 22. A spring 23 may be provided to normally hold the piston 21 at one end of the cylinder. In actual operation air pressure from within the tire will cause the piston 21 to move to the closed position when pressure is taken off the piston head. An end member 24 is provided with a nipple 25 adapted to engage the hose 16. At the other end the nipple 17 is adapted to engage the stem 18. A washer 26 is provided to prevent leakage. One side of the cylinder 20 is a by-pass 30 having openings 31 and 32 in the cylinder 20. When air pressure is applied to the hose 16 the air forces the piston 21 toward the other end of the cylinder and allows the air to pass through the opening 31 into the by-pass 30 and out the opening 32 into the tire. As the piston is pressed toward the other end of the cylinder the rod 22 will contact the pin 33 of the valve to depress it and to allow air to go into the tire. When pressure through the hose 16 is released the pressure from the tire will cause the piston to move toward the end 24 and this movement will be assured by the action of the spring 23, thus removing pressure on the pin 33 to allow the tire valve to close. In some instances it may be advantageous to place an ordinary tire valve in the outside connection 48 so that pressure readings may be taken with a hand gage. It is desirable that an annular groove 35 be cut in the inner wall of the cylinder 20. When the air hose is removed from the valve fixture 48 will close and leave pressure in the hose 16. Since the pressure will be substanitally equal on either side of the piston it will remain in the retarded position. However, when a hand gage is applied a certain amount of air will escape and the piston would normally move forward. Since the piston has a natural tendency to expand it will be checked by the groove 35 sufficiently to allow several readings to be taken and then when the valve in fixture 48 is open it will move forward into closed position.

In the form shown in Figure 4 the piston 40 is provided with a sleeve member 41 surrounding the end 42 of the rod 43. Mounted on the rod 43 is a platform 44. A spring 45 is mounted on the rod between the platform and the piston and a second spring 46 slightly weaker than the spring 45 is mounted below the platform around the rod. It will be seen that when air pressure is placed against the piston it will move downwardly against the spring 45 and eventually come into contact with the end 42 of the rod 43. However, the pressure of the spring 45 will be sufficient to overcome the spring 46 and the rod 43 will engage and depress the valve pin in the tire. This form of device is slightly more flexible than that shown in Figure 3 since it can accommodate various length tire valve pins without the piston being prematurely stopped due to a depressed tire valve pin and holding rod 43. The compressibility of spring 45 permits the piston to continue on its travel until an air passage is opened.

In the form shown in Figure 5 the cylinder 50 is provided with a piston 51. Mounted in the piston 51 is a valve 52 with the stem 53. The stem 53 mounts a platform 54 which supports a spring 55 between the platform 54 and piston 51. A weaker spring 56 is supported between the platform 54 and the end 57 of the device. When air is introduced through the nipple 16 under pressure a piston will move toward the end 57 carrying with it the stem or rod 53 until the rod is stopped by the valve pin compressing the spring 56. The piston will then continue against the pressure of the spring 55 unseating the valve 52 from its seat 58 and allowing air to pass through the cylinder. When the pressure is released spring 55 and the air pressure from the tire will cause the piston to move toward the nipple 16 and the valve 52 to return to its seat.

As shown in Figure 1 my device may be left permanently on the tire and the hose 16 fastened to a permanent outside connection 48. When air is placed in the tire it is only necessary to place the air hose against the connection 48.

I claim:

1. A tire valve actuating mechanism comprising a cylinder, a nipple on one end of said cylinder adapted to engage a conventional valve stem, a nipple on the opposite end of said cylinder adapted to engage an air hose, a piston in said cylinder, a rod resiliently connected to said piston and extending through said first-mentioned nipple, bypass means to allow air to pass said piston when said piston is forced toward said tire valve whereby said valve is opened first and then the by-pass is opened.

2. A device for actuating a tire valve having a stem with a pin mounted therein, said device including a cylinder, a nipple on one end of said cylinder adapted to engage the valve stem, a nipple on the opposite end of said cylinder adapted to engage an air hose, a piston in said cylinder, a rod, one end of said rod resiliently connected to said piston and its opposite end extending into said first-mentioned nipple, a by-pass communicating with the interior of said cylinder at opposite ends to allow the passage of air around said piston when said piston is forced towards said tire valve, whereby when air is admitted into said cylinder, said rod will contact the pin causing the valve to be opened first and then the by-pass.

3. A device for actuating a tire valve having a stem with a pin mounted therein, said device including a cylinder, a nipple on one end of said cylinder adapted to engage the valve stem, a nipple on the opposite end of said cylinder adapted to engage an air hose, a piston in said cylinder, a rod, one end of said rod resiliently connected to said piston and its opposite end extending into said first-mentioned nipple, a by-pass communicating with the interior of said cylinder at opposite ends to allow the passage of air around said piston when said piston is forced towards said tire valve, and spring means for yieldingly maintaining said piston at one end of said cylinder.

4. A device for actuating a tire valve having a stem with a pin mounted therein, said device including a cylinder, means for attaching said cylinder to the stem of the valve, a piston in said cylinder, a rod, one end of said rod resiliently connected to said piston and its opposite end extending into the valve stem, means for introducing air under pressure into said cylinder to force said piston towards the tire valve and said rod into the valve stem to contact the pin to open said valve, and a by-pass communicating with the interior of said cylinder at opposite ends to allow air to pass around the piston into the tire valve.

5. A device for actuating a tire valve having a stem with a pin mounted therein, said device including a cylinder, means for attaching said cylinder to the stem of the tire valve, a piston in said cylinder, a rod, one end of said rod resiliently connected to said piston and its opposite end extending into said valve stem, spring means for yieldingly holding said piston and rod away from the tire valve, means for introducing air under pressure into said cylinder, a by-pass communicating with the interior of said cylinder at opposite ends to allow air to pass around said piston into the tire valve, whereby when air is admitted into said cylinder said rod will contact the pin causing the valve to be opened first and then the by-pass.

6. A device for actuating a tire valve having a stem with a pin mounted therein, said device including a cylinder having an air inlet at one end and outlet means at the opposite end, a piston mounted in said cylinder, a rod, one side of said piston exposed to said air inlet and its opposite side resiliently connected to said rod, spring engaging means mounted on said rod intermediate its ends, a spring between said spring engaging means and said piston, and a second spring having less resistance than said first-mentioned spring between said spring engaging means and the outlet end of the cylinder.

7. A device for actuating a tire valve having a stem with a pin mounted therein, said device including a cylinder, outlet means at one end of said cylinder adapted to engage the tire valve stem, and inlet means at the other end adapted to engage an air hose, a piston in said cylinder, said piston being located adjacent said inlet end, a sleeve member on said piston, a rod, one end of said rod slidably mounted in said sleeve member and the opposite end extending into the outlet end of the cylinder for cooperation with the valve pin, spring engaging means on said rod intermediate its ends, a spring between said spring engaging means and said piston, a second spring between said spring engaging means and the outlet end of the cylinder, a by-pass in said cylinder, said by-pass communicating with the interior of said cylinder to allow the passage of air around said piston when said piston is forced a predetermined amount toward the outlet end of said cylinder.

HENRY BRUMMER.

REFERENCES CITED

The following references are of record in the file of this patent:

UNITED STATES PATENTS

| Number | Name | Date |
|---|---|---|
| 1,602,209 | Proell | Oct. 5, 1926 |
| 2,053,992 | Haas | Sept. 8, 1936 |
| 2,148,616 | Gruber | Feb. 28, 1939 |
| 2,149,670 | Fetterly | Mar. 7, 1939 |
| 2,154,572 | Lansing | Apr. 18, 1939 |
| 2,342,726 | Crowley | Feb. 29, 1944 |

FOREIGN PATENTS

| Number | Country | Date |
|---|---|---|
| 361,072 | Great Britain | Nov. 19, 1931 |